March 19, 1935.  S. KOBZY  1,995,208

BEARING LUBRICATOR

Filed July 30, 1934

Inventor:
Steven Kobzy,
By Banning & Banning
Attys.

Patented Mar. 19, 1935

1,995,208

UNITED STATES PATENT OFFICE 1,995,208

BEARING LUBRICATOR

Steven Kobzy, Chicago, Ill.

Application July 30, 1934, Serial No. 737,491

4 Claims. (Cl. 308—132)

This invention is concerned with a bearing lubricator especially adapted for light inexpensive motors which are often operated with little or no attention over long periods of time. It is accordingly an object of my invention to provide for such a bearing a simple and effective lubricator which will function over a long period of service to supply oil in an adequate amount to a constantly rotating shaft.

An exemplification of this invention is set forth in the accompanying drawing wherein—

A small motor, such as used for electric fans, will ordinarily include a rotating shaft S having its opposite ends journaled in bearing B. Such a motor may be housed within a casing C which, if desired, may support the shaft bearings in the manner to be presently explained.

Figure 1:
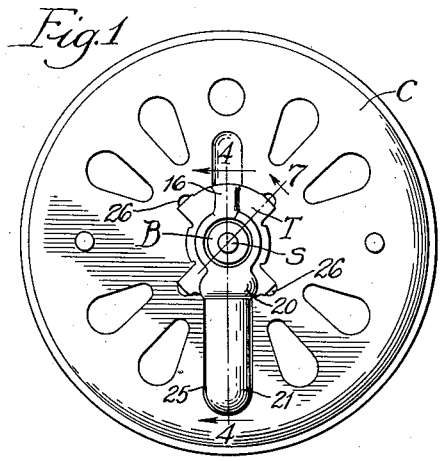
Figure 1 is a view in elevation looking toward one end of a motor casing equipped with a bearing with which is associated the present lubricator.
Figure 2:
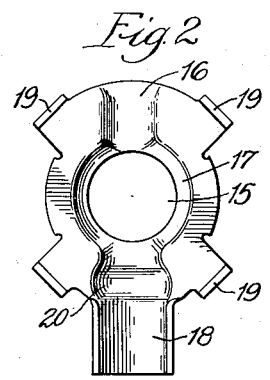
Figs. 2 and 3 are views in elevation looking toward the inner sides of two complementary plates which, when assembled, form the tube unit of the lubricator.
Figure 3:
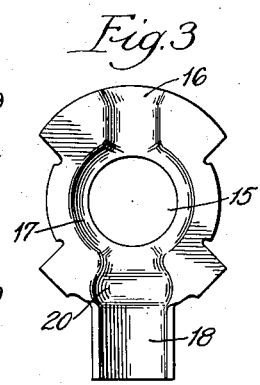
Figure 5:
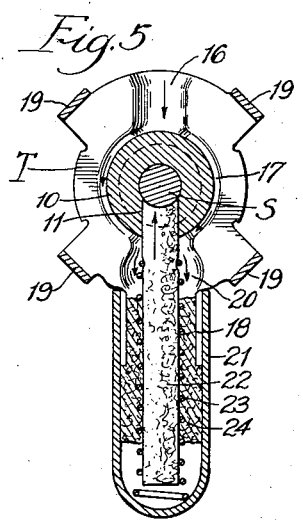
Fig. 5 is a similar view on line 5—5 of Fig. 4.
Figure 4:
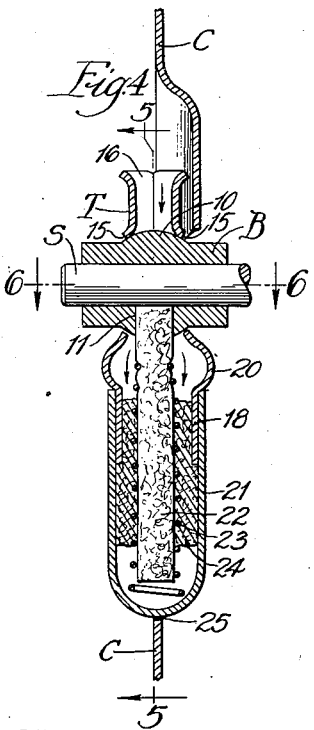
Fig. 4 is a view in section on line 4—4 of Fig. 1 showing one end of the motor shaft and supporting bearing together with the associated lubricator.
Figure 6:
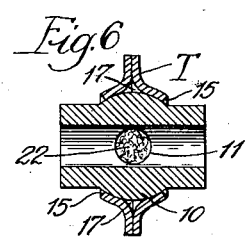
Fig. 6 is a view in section on line 6—6 of Fig. 4.
Figure 7:
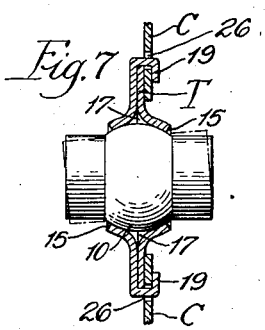
Fig. 7 is a detail in section on line 7 of Fig. 1.

Each bearing B, as shown, is in the form of a sleeve having an annular swell 10 forming a convex rib which is disposed intermediately of the bearing ends. Extending through the lower wall of the bearing in line with the rib is a radial port 11. Fitted upon the rib so as to be angularly adjustable thereupon, is a tube T open at its upper and lower ends. This tube is desirably formed from a pair of complementary plates (see Figs. 2 and 3) each having a central aperture 15 of proper size to fit over the convex rib in the manner shown in Figs. 4, 6 and 7. Each plate is outwardly swelled at its upper end to provide a passage 16, it is further swelled outwardly at 17 around its central aperture to provide a boss, and in its lower region is again swelled outwardly to provide a passage 18. By such a construction the two plates, when fitted together, provide, in effect, a tube which is open from top to bottom. In addition, the oppositely directed bosses are adapted to seat upon the swelled rib of the bearing, permitting, as required, of adjustability of the tube relative to the bearing. The open passageway between opposite ends of the tube is maintained even when the bearing is fitted transversely through the opposite apertures 15 of the tube, by reason of the arcuate channels which follow around the bearing in the meeting plane of the two plates which together form the tube. In their assembled relation the tube plates are secured as by tongues 19 which extend from the edges of one to engage and lock with the edges of the other.

The lower portion of the tube is desirably swelled out circumferentially as at 20 to form a shoulder. Below the shoulder I have mounted on the tube a cup 21 closed at its lower end. This cup is permanently attached to the lower end of the tube as by a friction fit or otherwise. Within the cup is arranged a wick 22 which may be engaged by a coiled spring 23 and surrounding the spring I have shown an absorbent spacer 24. The upper end of the wick extends into the tube and within the radial port 11 to present its acting end against the shaft S whereby to deliver oil thereto.

The casing C is desirably cut out as at 25 for the reception of the lower end of the tube. It is also provided with apertures 26 through which the tongues 19 may be extended for clamping on the reverse side. Accordingly, such a clamp lock is effective to secure together the two plates forming the tube as well as to secure the tube in its entirety in a fixed position on the casing. In the region of the upper end of the tube for the accomodation thereof, the casing is inset as at 27.

In practice, a few drops of oil are delivered into the open upper end of the tube. The oil then courses downwardly through the arcuate passageways around the convex rib to discharge into the cup which depends from the lower end of the tube. When a full supply of oil has been introduced, the spacer and wick will have absorbed enough of the oil to furnish a constant feed thereof to the rotating shaft.

Figure 8:
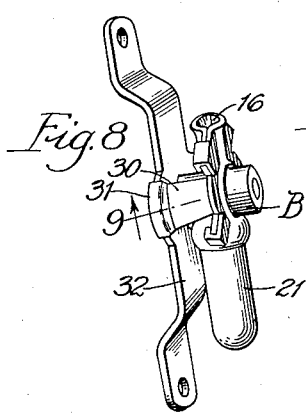
Fig. 8 is a view in perspective of the bearing and lubricator assembly in connection with a supporting bracket.
Figure 9:
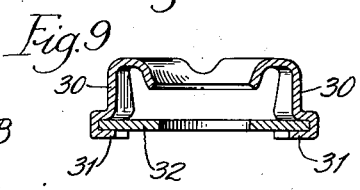
Fig. 9 is a detail in section on line 9 of Fig. 8.

It is, of course, entirely feasible to mount the bearing directly upon the motor rather than upon the casing in which the motor is housed. An example of this is suggested in Figs. 8 and 9 wherein I utilize exactly the same bearing and lubricator assembly. In this construction, however, the rear tube plate is formed with a pair of arms 30 the ends of which are in locking engagement at 31 with a bracket plate 32 receiving support as from the motor direct.

From the standpoint of simplicity and economy in construction, the present lubricator has numerous advantages. The parts may all be formed by die operations, and no screw machine work is necessary. When assembled and locked together, the two units of the tube, and the cup which depends therefrom, will remain inseparably united.

Replenishment of the oil supply is readily taken care of by having the tube extend upwardly to a point above the bearing where its open mouth is readily accessible. No special passageway connecting the upper and lower ends of the tube need be provided, as in the meeting plane of the two plates arcuate passageways are formed around the bearing capable of leading oil directly to the cup therebelow.

I claim:

1. In combination with a shaft bearing having a radial port in line with a convex rib extending circumferentially around the bearing, a tube formed from two complementary apertured plates adapted for fitting upon the bearing rib and extending above and below the same and providing a passageway around the rib whereby to preserve communication between the opposite open ends of the tube, a cup depending from the lower tube end and in permanent connection therewith, and an oil wick within the cup supported resiliently within the radial port of the bearing for engagement with a shaft therewithin.

2. In combination with a shaft bearing having a radial port, a tube formed from two complementary apertured plates adapted for fitting upon the bearing and extending above and below the same and providing a passageway around the bearing whereby to preserve communication between the opposite open ends of the tube, a cup depending from the lower tube end and in connection therewith, and an oil wick within the cup extending within the radial port of the bearing for engagement with the shaft therewithin.

3. In combination with a shaft bearing having a radial port, two apertured plates adapted for fitting upon the bearing, the two plates cooperating with each other to provide a passageway extending from a point above the bearing around and below the bearing, means integral with the two plates for interconnecting them in unitary relation, a cup connecting with the lower end of the passageway, and a wick extending from the cup within the radial port of the bearing to conduct oil to a shaft within the bearing.

4. In combination with a shaft bearing having a radial port, two complementary plates adapted for fitting upon the bearing and forming between them a passageway extending above, around and below the bearing, a cup in communication with the lower ends of the two plates and acting to hold them against separation, and a wick extending from the cup within the radial port of the bearing to conduct oil to a shaft within the bearing.

STEVEN KOBZY.